United States Patent
Kim et al.

(10) Patent No.: US 10,777,779 B2
(45) Date of Patent: Sep. 15, 2020

(54) LEVELING APPARATUS FOR PREVENTING CURLING OF POUCH-TYPE SECONDARY BATTERY

(71) Applicant: LG CHEM, LTD., Seoul (KR)

(72) Inventors: Hyun-Tae Kim, Daejeon (KR); Byung-Heon Shin, Daejeon (KR); Woo-Yong Lee, Daejeon (KR)

(73) Assignee: LG Chem, Ltd. (KR)

( * ) Notice: Subject to any disclaimer, the term of this patent is extended or adjusted under 35 U.S.C. 154(b) by 71 days.

(21) Appl. No.: 16/316,734

(22) PCT Filed: Feb. 28, 2018

(86) PCT No.: PCT/KR2018/002479
§ 371 (c)(1),
(2) Date: Jan. 10, 2019

(87) PCT Pub. No.: WO2018/174423
PCT Pub. Date: Sep. 27, 2018

(65) Prior Publication Data
US 2019/0207172 A1    Jul. 4, 2019

(30) Foreign Application Priority Data

Mar. 20, 2017  (KR) ........................ 10-2017-0034958

(51) Int. Cl.
*H01M 2/02* (2006.01)
*B32B 38/00* (2006.01)
(Continued)

(52) U.S. Cl.
CPC ........... *H01M 2/0207* (2013.01); *B32B 38/00* (2013.01); *B32B 38/0012* (2013.01);
(Continued)

(58) Field of Classification Search
CPC ... H01M 2/0207; H01M 2/0275; B32B 43/00; B32B 38/00; B65H 23/34
See application file for complete search history.

(56) References Cited

U.S. PATENT DOCUMENTS 3,890,160 A     6/1975  Daniels, Jr.
6,656,232 B1 *  12/2003 Usui ....................... H01M 2/26
                                                    141/32
(Continued)

FOREIGN PATENT DOCUMENTS

CN    1193195 A    9/1998
CN    1218579 A    6/1999
(Continued)

OTHER PUBLICATIONS

International Search Report for PCT/KR2018/002479 (PCT/ISA/210) dated Jun. 28, 2018.
(Continued)

*Primary Examiner* — Stewart A Fraser
(74) *Attorney, Agent, or Firm* — Lerner, David, Littenberg, Krumholz & Mentlik, LLP

(57) ABSTRACT

A leveling apparatus used in a cutting process after forming process of a pouch-type secondary battery, and the leveling apparatus includes: a roller assembly having pairs of upper rollers and lower rollers arranged in at least two rows for rolling in contact with upper and lower surfaces adjacent to both rim edges of the pouch-type secondary battery; and a support frame supporting the roller assembly, wherein the roller assembly applies rolling with respect to the upper and lower surfaces adjacent to both rim edges of the pouch-type secondary battery to thereby remove stress.

10 Claims, 3 Drawing Sheets

(51) Int. Cl.
  *H01M 10/04* (2006.01)
  *B32B 43/00* (2006.01)
  *B65H 23/34* (2006.01)

(52) U.S. Cl.
  CPC ............ *B32B 43/00* (2013.01); *B65H 23/34* (2013.01); *H01M 2/0275* (2013.01); *B32B 2038/0064* (2013.01); *B65H 2301/51256* (2013.01); *B65H 2601/254* (2013.01); *B65H 2701/1322* (2013.01); *B65H 2801/72* (2013.01); *H01M 10/0404* (2013.01)

(56) References Cited

U.S. PATENT DOCUMENTS

| | | |
|---|---|---|
| 9,287,566 B1 | 3/2016 | Chou et al. |
| 2011/0244287 A1 | 10/2011 | Kim et al. |
| 2014/0377641 A1 | 12/2014 | Kim et al. |
| 2016/0049682 A1 | 2/2016 | Won et al. |
| 2016/0093839 A1* | 3/2016 | Iseri ............... H01M 2/0207 429/127 |

FOREIGN PATENT DOCUMENTS

| | | |
|---|---|---|
| CN | 104620407 A | 5/2015 |
| KR | 10-2004-0079531 A | 9/2004 |
| KR | 20-2010-0010245 U | 10/2010 |
| KR | 10-2013-0106548 A | 9/2013 |
| KR | 10-1417152 B1 | 8/2014 |
| KR | 10-2014-0132528 A | 11/2014 |
| KR | 10-2014-0147372 A | 12/2014 |
| KR | 10-2015-0025687 A | 3/2015 |
| KR | 10-2015-0045097 A | 4/2015 |
| KR | 10-2016-0136540 A | 11/2016 |

OTHER PUBLICATIONS

Search Report from Chinese Office Action for 2018800034038 dated Jul. 3, 2020; 3 pages.

* cited by examiner

LEVELING APPARATUS FOR PREVENTING CURLING OF POUCH-TYPE SECONDARY BATTERY

TECHNICAL FIELD

The present disclosure relates to a leveling apparatus used for manufacturing a pouch-type secondary battery, and more particularly, to a leveling apparatus used in a pouch cutting process of a pouch-type secondary battery manufacturing procedure.

The present application claims priority to Korean Patent Application No. 10-2017-0034958 filed on Mar. 20, 2017 in the Republic of Korea, the disclosures of which are incorporated herein by reference.

BACKGROUND ART

Generally, a method of manufacturing a pouch-type secondary battery includes the steps of injecting an electrolyte through an electrolyte injection portion located at one side of a rim region of a prepared pouch-type secondary battery, primarily sealing the electrolyte injection portion along a primary sealing line and then performing charging/discharging, cutting a part of the electrolyte injection portion along a cutting line located at an inner side of the primary sealing line, performing degassing, secondarily sealing the electrolyte injection portion, and cutting a part of the electrolyte injection portion along a cutting line located at an outer side of the secondary sealing line.

In addition, after the pouch is completely formed, a cutting process is performed to cut unnecessary portions of the edge area of the pouch.

However, as shown in FIG. 1, generally, when a pouch-type secondary battery 1 is completely cut, at least one corner is bent due to a stress remaining at the edge of the pouch to cause a curling portion 2, thereby deteriorating the product quality.

In relation to this problem, in order to prevent the problem that the pouch is rolled up due to the forming pressure, Patent Literature 1 discloses a vacuum adsorption positioning forming mold, which vacuum-absorbs an aluminum pouch to allow satisfactory positioning when the aluminum pouch used for manufacturing a cellular phone battery is formed and cut.

As another alternative, Patent Literature 2 directed to improving the warping phenomenon in a manufacturing process discloses a pouch exterior for a secondary battery and its manufacturing method, which has an accommodation portion in which an electrode assembly is accommodated and a groove is additionally formed along an edge region of the pouch exterior.

However, the conventional techniques related to solving the curling problem of the pouch have a complicated device structure and may not be universally applied to a pouch-type secondary battery manufacturing process.

RELATED LITERATURES

Patent Literature 1: Korean Unexamined Patent Publication No. 2004-0079531
Patent Literature 2: Korean Unexamined Patent Publication No. 2014-0132528

DISCLOSURE

Technical Problem

The present disclosure is designed to solve the problems of the related art, and therefore the present disclosure is directed to providing a leveling apparatus, which may prevent a pouch from being curled after a cutting process by using a technical means for removing a stress existing at a rim portion of the pouch during a pouch-type secondary battery manufacturing procedure.

Technical Solution

In one aspect of the present disclosure, there is provided a leveling apparatus used in a cutting process after forming process of a pouch-type secondary battery, the leveling apparatus comprising: a roller assembly having pairs of upper rollers and lower rollers arranged in at least two rows to be capable of rolling in contact with upper and lower surfaces adjacent to two rim edges of the pouch-type secondary battery; and a support frame configured to support the roller assembly, wherein the roller assembly is configured to apply rolling with respect to the upper and lower surfaces adjacent to the two rim edges of the pouch-type secondary battery to thereby remove stress.

In the roller assembly, rollers may be disposed to be divided into a first roller set located at a relatively front portion based on a travelling direction of the pouch-type secondary battery and a second roller set located at a relatively rear portion.

The support frame may include a first frame configured to support the first roller set and a second frame disposed to be spaced apart from the first frame to support the second roller set.

The support frame may include an elongated hole and a guide bolt coupled to the elongated hole to adjust height and location of the first and second frames in vertical and horizontal directions.

The support frame may include an elongated hole and a guide bolt coupled to the elongated hole to adjust a gap between the upper rollers and the lower rollers.

The lower rollers may be disposed obliquely from the upper rollers to be biased to one side from locations exactly opposed to the upper rollers with a predetermined deviation.

The support frame may include: a lower unit provided at the support; and an upper unit mounted to the lower unit, and the roller assembly may be provided at the upper unit.

The lower roller may be supported by a movable block provided at the upper unit.

The movable block may be mounted to be movable with respect to the upper unit.

The upper rollers and the lower rollers may be made of synthetic resin material that does not damage the surface of the pouch-type secondary battery.

Advantageous Effects

According to the present disclosure, it is possible to suppress curling during a cutting process by applying a physical force to upper and lower surfaces near a rim edge of a pouch using rollers to remove the stress.

Thus, if the present disclosure is applied, it is possible to manufacture a high quality pouch-type secondary battery in which the pouch has a uniform and flat rim portion.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
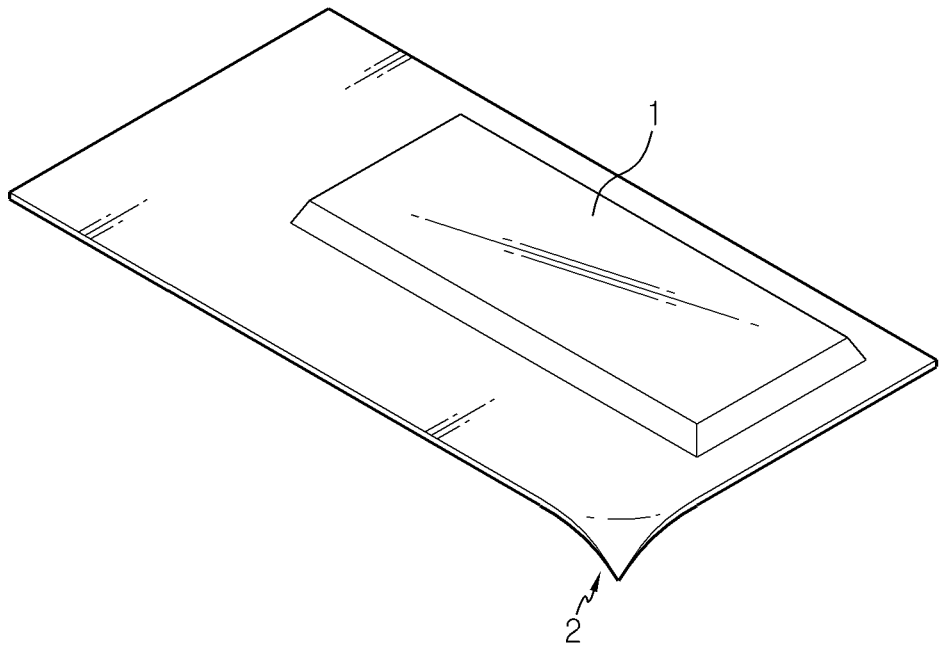
FIG. 1 is a perspective view showing an example where curling occurs at a pouch-type secondary battery when a pouch is formed and then completely cut according to the conventional art.
Figure 2:
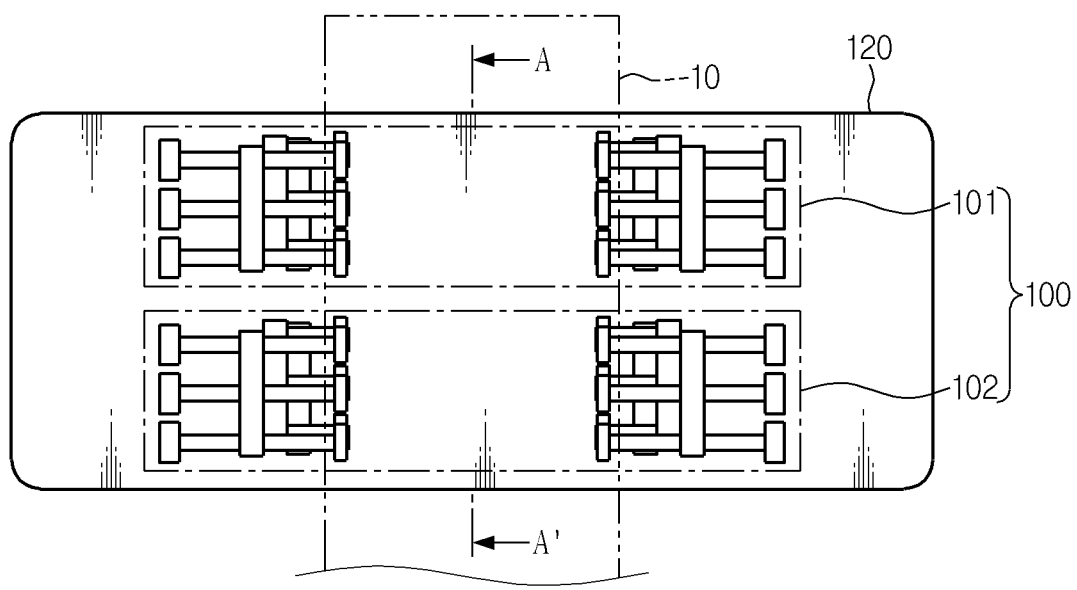
FIG. 2 is a plane view showing a leveling apparatus according to an embodiment of the present disclosure.
Figure 3:
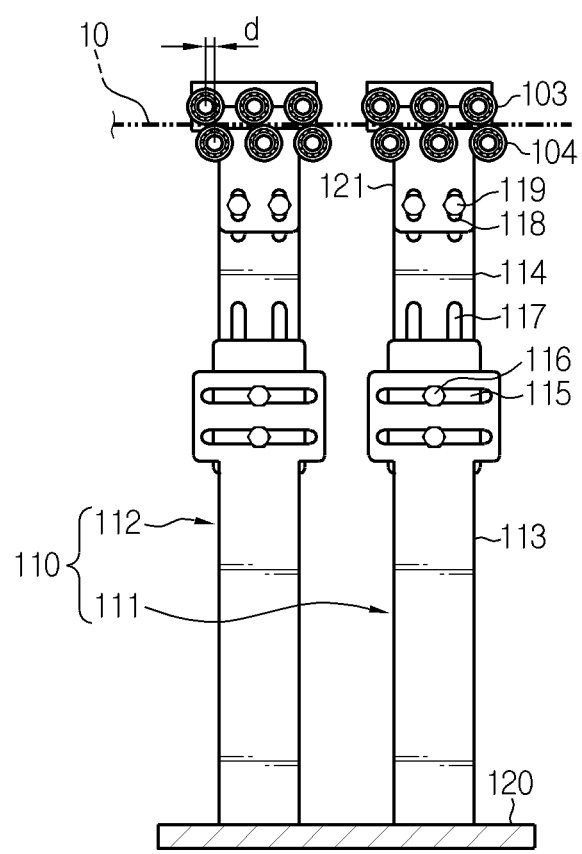
FIG. 3 is a cross-sectioned view, taken along the line A-A' of FIG. 2.
Figure 4:
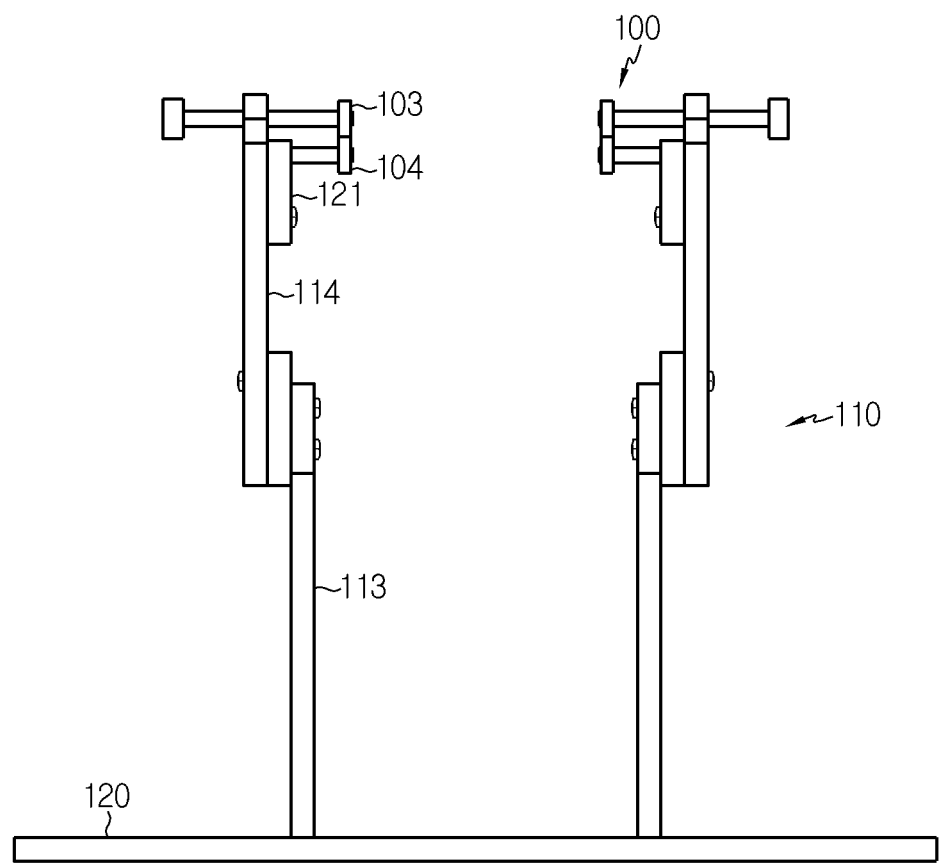
FIG. 4 is a front view of FIG. 2.

FIG. 2 is a plane view showing a leveling apparatus according to an embodiment of the present disclosure, FIG. 3 is a cross-sectioned view, taken along the line A-A' of FIG. 2, and FIG. 4 is a front view of FIG. 2.

Referring to FIGS. 2 to 4, a leveling apparatus according to an embodiment of the present disclosure includes a roller assembly 100 in which pairs of upper rollers 103 and lower rollers 104 are arranged in at least two rows, and a support frame 110 supporting the roller assembly 100.

The leveling apparatus according to the present disclosure is used in a cutting process in which a rim edges is partially cut after forming process of the pouch-type secondary battery 10.

The pouch-type secondary battery 10 to which the present disclosure is applied has a thin plate-like body as a whole, and includes a pouch case and an electrode assembly embedded in the pouch case and having a positive electrode, a separator and a negative electrode alternately stacked. The positive and negative electrodes are prepared by applying a slurry of an electrode active material, a binder resin, a conductive agent and other additives to at least one surface of a current collector. In the positive electrode, a common positive electrode active material such as a lithium-containing transition metal oxide may be used. In the negative electrode, a common negative electrode active material such as a lithium metal, a carbonaceous material, a metal compound, or mixtures thereof, which are capable of intercalating and deintercalating lithium ions, may be used. In addition, as the separator, a common porous polymer film used in a lithium secondary battery may be employed.

As the electrolyte accommodated in the pouch case together with the electrode assembly, a common electrolyte for a lithium secondary battery may be employed. The pouch case is formed of a sheet material and has an accommodation portion for accommodating the electrode assembly. Preferably, the pouch case is prepared by coupling a first case and a second case, which are formed by processing a sheet material into a predetermined shape. The sheet material of the pouch case has a multi-layered structure in which an outer resin layer made of an insulating material such as polyethylene terephthalate (PET) or nylon and provided at an outermost side, a metal layer made of aluminum to maintain the mechanical strength and prevent the penetration of moisture and oxygen, and an inner resin layer made of a polyolefin-based material having thermal adhesiveness to serve as a sealing material are laminated.

In the sheet material of the pouch case, a predetermined adhesive resin layer may be interposed between the inner resin layer and the metal layer and between the outer resin layer and the metal layer, if necessary. The adhesive resin layer is intended for good adhesion between dissimilar materials and is formed as a single layer or a multilayer. The material of the adhesive resin layer is usually a polyolefin-based resin, or a polyurethane resin for smooth processing, or a mixture thereof.

An edge portion of the pouch-type secondary battery 10 is a region sealed by thermal compression or the like. Thus, the edge portion of the pouch-type secondary battery 10 has a relatively small thickness compared to a body portion.

The leveling apparatus according to the present disclosure receives the pouch-type secondary battery 10 configured as above, and during a cutting process of cutting a part of a rim edge of the pouch, rolls both surfaces thereof near the rim edge by using a plurality of rollers to remove stress and prevent the occurrence of curling.

Here, a driving force for supplying the pouch-type secondary battery 10 may be obtained by a separate conveyor device. Alternatively, a predetermined driving unit may be added to the leveling apparatus to generate a driving force for supplying the pouch-type secondary battery 10.

The roller assembly 100 includes plural pairs of upper rollers 103 and lower rollers 104 which simultaneously perform rolling in contact with both upper and lower surfaces adjacent to both rim edges of the pouch-type secondary battery 10 to which a pouch forming process is completed.

The pairs of upper rollers 103 and lower rollers 104 of the roller assembly 100 are arranged in at least two rows based on a travelling direction (a feeding direction) of the pouch-type secondary battery 10 to correspond to both surfaces thereof, as shown in FIG. 2.

The upper rollers 103 and the lower rollers 104 are preferably made of a synthetic resin material that does not damage the surface of the pouch because they are in direct contact with the upper and lower surfaces of the pouch-type secondary battery 10.

In the roller assembly 100, rollers are disposed to be divided into a first roller set 101 located at a relatively front portion (forwards) and a second roller set 102 located at a relatively rear portion based on the travelling direction of the pouch-type secondary battery 10.

According to the divided arrangement, the positions of the pairs of upper rollers 103 and lower rollers 104 may be precisely adjusted suitable for the size of the pouch-type secondary battery 10 that requires a leveling work. Also, if any roller needs to be repaired, only a roller set at which the corresponding roller is located may be easily disassembled, so it is easy to maintain the rollers.

As shown in FIG. 3, the support frame 110 is assembled to vertically erect on the support 120 to support the roller assembly 100. The support frame 110 includes a first frame 111 configured to support the first roller set 101 and a second frame 112 disposed to be spaced apart from the first frame 111 in a front direction based on the travelling direction of the pouch-type secondary battery 10 to support the second roller set 102.

The support frame 110 may be configured using a combination of rigid metal plates or blocks. Preferably, the first frame 111 and the second frame 112 may be provided as an assembly of a lower unit 113 and an upper unit 114, respectively.

Specifically, the support frame 110 may include a lower unit 113 provided at the support 120 and an upper unit 114 mounted to the lower unit 113. Here, the roller assembly 100 may be provided at the upper unit 114.

The support frame 110 includes an elongated hole 115 for adjusting the position of the frame in a lateral direction with respect to the support 120, and a guide bolt 116 inserted into the elongated hole 115 and fastened thereto by screwing.

In addition, the support frame 110 includes an elongated hole 117 for adjusting the height of the frame in a vertical direction with respect to the support 120, and a guide bolt (not shown) inserted into the elongated hole 117 and fastened thereto by screwing.

The upper unit 114 and the lower unit 113 of the first frame 111 and the second frame 112 are fixed by adjusting the positions thereof so that the guide bolt 116 is capable of sliding along the elongated hole 115, and then tightening the guide bolt 116. By this adjustment, the gap between the first roller set 101 and the second roller set 102 may be controlled.

In addition, the support frame 110 includes an elongated hole 118 for adjusting the gap between the upper roller 103 and the lower roller 104, and a guide bolt 119 inserted into the elongated hole 118 and fastened thereto by screwing. As shown in FIG. 4, the lower roller 104 is supported by a movable block 121 provided at the upper unit 114, and the gap between the upper roller 103 and the lower roller 104 may be adjusted by moving the movable block 121 with respect to the upper unit 114.

Here, the movable block 121 may be mounted to be movable with respect to the upper unit 114. Specifically, the movable block 121 is positioned so that the guide bolt 119 is capable of sliding along the elongated hole 118, and then is fixed by fastening the guide bolt 119 so that the location of the lower roller 104 is set with respect to the upper roller 103.

If the gap between the upper roller 103 and the lower roller 104 is adjusted, the rolling strength for removing the stress during the rolling operation may be adjusted, thereby making it possible to precisely control the curling prevention function.

Seeing the arrangement of the upper rollers 103 and the lower rollers 104, as shown in FIG. 3, it is advantageous in terms of ensuring sufficient rolling strength for the upper and lower surfaces of the pouch that the lower rollers 104 are disposed somewhat obliquely from the upper rollers 103 to be biased to one side from locations exactly opposed to the upper rollers 103 with a predetermined deviation d. Considering the travelling direction of the pouch-type secondary battery 10 as shown in FIG. 3, it is preferable that the lower rollers 104 are disposed to be biased to the front to more stably support the pouch-type secondary battery 10.

The leveling apparatus according to an embodiment of the presenting disclosure, configured as above, removes stress and thereby prevents the occurrence of curling since the roller assembly 100 is configured to apply rolling with respect to the upper and lower surfaces near both rim edges of the pouch-type secondary battery 10 thereby.

The pouch-type secondary battery 10 in a completely formed state is fed so that both rim edges are interposed between the plural pairs of upper rollers 103 and lower rollers 104 that are arranged in two rows.

The plural pairs of upper rollers 103 and lower rollers 104 of the roller assembly 100 remove the stress generated in the previous process and remaining at the present by applying a physical force, generated by rolling, to the upper and lower surfaces near both rim edges of the pouch.

The plural pairs of upper rollers 103 and lower rollers 104 simultaneously perform a rolling operation with respect to the upper and lower surfaces of the pouch-type secondary battery 10. At this time, the rolling strength may be optimized by adjusting the gap between the upper roller 103 and the lower roller 104.

If a cutting process for cutting a part of the rim edge of the pouch-type secondary battery 10 is performed in a state where the stress existing at the rim edge of the pouch-type secondary battery 10 is removed by using the roller assembly 100 of the leveling apparatus as described above, the curling phenomenon that a corner of the pouch is bent does not occur since the stress is removed in advance.

As described above, if the leveling apparatus according to the present disclosure is applied, the occurrence of curling at the corner portion is prevented during the cutting process for the pouch-type secondary battery, and thus it is possible to manufacture a high quality pouch-type secondary battery at which the rim portion of the pouch maintains uniform flatness.

The present disclosure has been described in detail. However, it should be understood that the detailed description and specific examples, while indicating, preferred embodiments of the disclosure, are given by way of illustration only, since various changes and modifications within the scope of the disclosure will become apparent to those skilled in the art from this detailed description.

What is claimed is:

1. A leveling apparatus used in a cutting process after a forming process of a pouch-type secondary battery, the leveling apparatus comprising:
   a roller assembly having pairs of upper rollers and lower rollers arranged in at least two rows to be capable of rolling in contact with upper and lower surfaces adjacent to two rim edges of the pouch-type secondary battery; and
   a support frame configured to support the roller assembly,
   wherein the roller assembly is configured to apply rolling with respect to the upper and lower surfaces adjacent to the two rim edges of the pouch-type secondary battery to thereby remove stress.

2. The leveling apparatus according to claim 1,
   wherein in the roller assembly, rollers are disposed to be divided into a first roller set located at a relatively front portion based on a travelling direction of the pouch-type secondary battery and a second roller set located at a relatively rear portion.

3. The leveling apparatus according to claim 2,
   wherein the support frame includes a first frame configured to support the first roller set and a second frame disposed to be spaced apart from the first frame to support the second roller set.

4. The leveling apparatus according to claim 3,
   wherein the support frame includes an elongated hole and a guide bolt coupled to the elongated hole to adjust height and location of the first and second frames in vertical and horizontal directions.

5. The leveling apparatus according to claim 3,
wherein the support frame includes an elongated hole and a guide bolt coupled to the elongated hole to adjust a gap between the upper rollers and the lower rollers.

6. The leveling apparatus according to claim 1,
wherein the lower rollers are disposed obliquely from the upper rollers to be biased to one side from locations exactly opposed to the upper rollers with a predetermined deviation.

7. The leveling apparatus according to claim 1,
wherein the support frame includes:
a lower unit provided at the support; and
an upper unit mounted to the lower unit,
wherein the roller assembly is provided at the upper unit.

8. The leveling apparatus according to claim 7,
wherein the lower roller is supported by a movable block provided at the upper unit.

9. The leveling apparatus according to claim 8,
wherein the movable block is mounted to be movable with respect to the upper unit.

10. The leveling apparatus according to claim 1,
wherein the upper rollers and the lower rollers are made of synthetic resin material that does not damage the surface of the pouch-type secondary battery.

* * * * *